Figure 1:
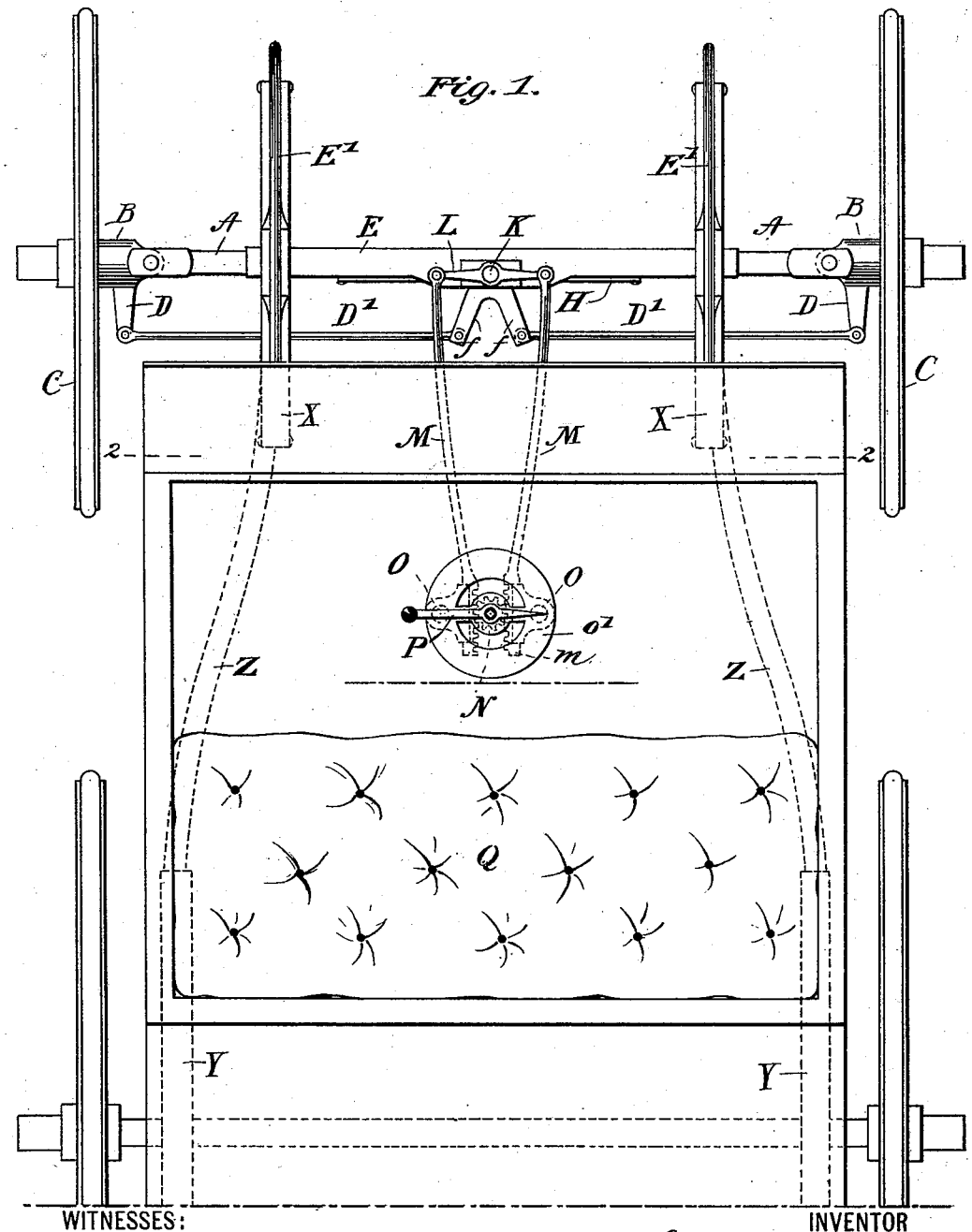

(No Model.)  2 Sheets—Sheet 1.
F. C. HAAS.
RUNNING GEAR FOR VEHICLES.

No. 539,736.  Patented May 21, 1895.

WITNESSES:  INVENTOR
Frank S. Ober  Frederick C. Haas
Catharine Georgi  BY
 Baldwin, Davidson & Wight
 ATTORNEYS.

(No Model.) 2 Sheets—Sheet 2.
F. C. HAAS.
RUNNING GEAR FOR VEHICLES.
No. 539,736. Patented May 21, 1895.
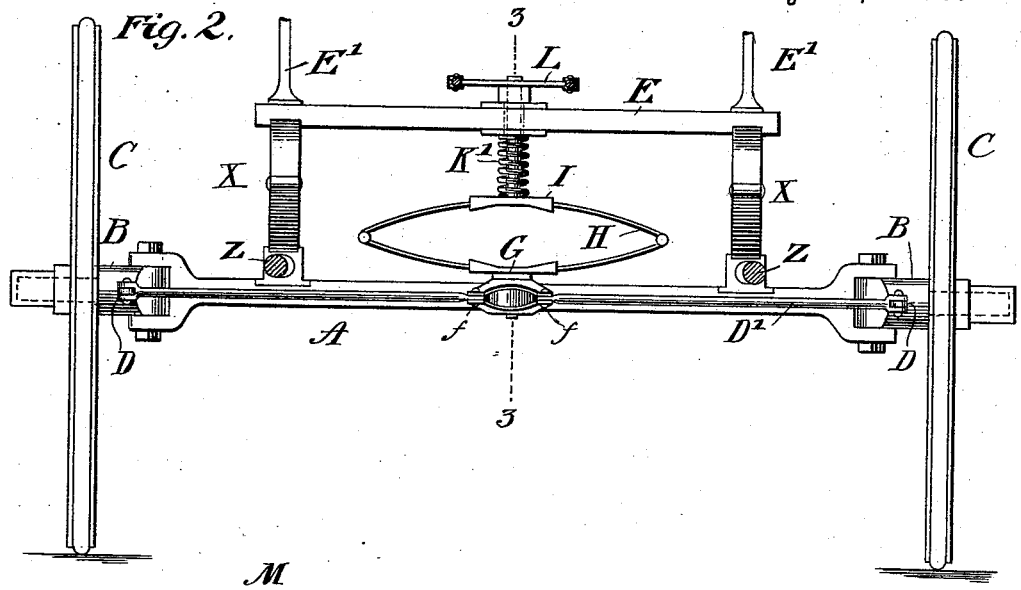
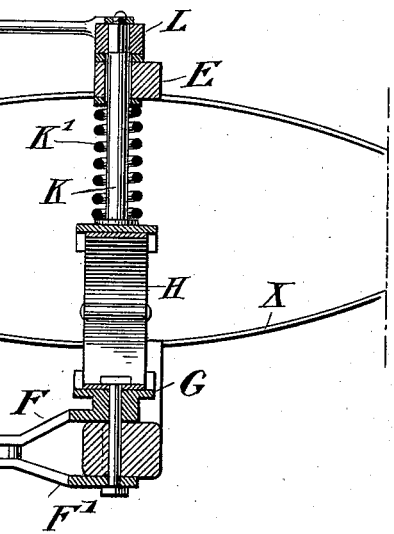
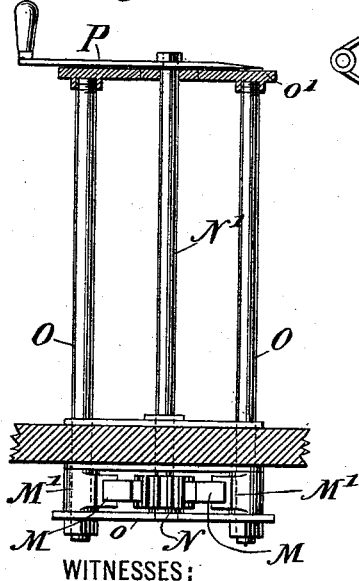
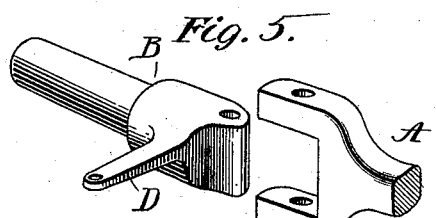
WITNESSES:
Frank S. Ober
Catharine Georgi
INVENTOR
Frederick C. Haas
BY
Baldwin, Davidson & Wight
ATTORNEYS.
THE NORRIS PETERS CO., PHOTO-LITHO., WASHINGTON, D. C.

UNITED STATES PATENT OFFICE.

FREDERICK C. HAAS, OF NEW YORK, N. Y., ASSIGNOR TO AMOS ROGERS, OF SAME PLACE.

RUNNING-GEAR FOR VEHICLES.

SPECIFICATION forming part of Letters Patent No. 539,736, dated May 21, 1895.

Application filed December 21, 1893. Renewed December 1, 1894. Serial No. 530,608. (No model.)

*To all whom it may concern:*

Be it known that I, FREDERICK C. HAAS, a citizen of the United States, residing in the city, county, and State of New York, have invented certain new and useful Improvements in Running-Gear for Vehicles, of which the following is a specification.

My invention relates more especially to that class of power driven vehicles adapted to run upon an ordinary roadway. Its object is to provide a suitable and convenient organization by which the occupant may readily direct the course of the vehicle. To this end one of the axles, say the front one, is made shorter than usual, and has pivoted to it at each end a short or stud axle upon which the carrying wheel revolves. Through the medium of connecting mechanism extending from such stud axles to a steering device within the reach of the occupant, he is enabled to swing the stud axles upon their pivots to direct the course of the vehicle.

In the accompanying drawings I have shown only so much of a vehicle and its running gear as is necessary or desirable to illustrate the invention.

Figure 1 is a plan view; Fig. 2, a section on the line 2 2 of Fig. 1; Fig. 3, a detail section on the line 3 3 of Fig. 2; Fig. 4, a detail sectional view showing the steering apparatus directly manipulated by the operator; and Fig. 5 is a detail perspective view showing one end of the main axle and the stud-axle disconnected therefrom.

The dotted lines X X, Y Y in Fig. 1 indicate any ordinary and suitable springs by which the box or body of the vehicle is carried upon the axles, and Z Z indicate the ordinary hounds or braces.

The front axle A is bifurcated at each end and between such bifurcations is pivoted a stud axle B, upon which the wheel C revolves. A bracket or arm D is shown projecting rearwardly from each stud axle. A cross-piece E is mounted upon the springs X X above and parallel with the axle, and is connected by curved rods or stiff springs E' E' with the box or body. At the middle of the axle is pivoted a bracket having two rearwardly extending arms $ff$ and composed of two plates F' F', arranged one above and the other below the axle, and turning upon a bolt F passing through them and through the axle. A clip G is rigidly connected with the upper plate by being riveted thereto or otherwise, and in this clip is seated an elliptical spring H, arranged parallel with the axle. The arms $ff$ of the bracket are connected by rods D' with the rearwardly projecting arms on the stud axles. A clip I embraces the upper part of the elliptical spring, and is rigidly connected with a rocking bolt K which has its bearings in the cross-bar E, and a coil spring K' is interposed between the clip and a washer bearing against the under side of the cross-bar. The upper end of the bolt K carries a cross-arm L each end of which has pivoted to it a rearwardly extending arm M that has formed upon its end or attached thereto an ordinary toothed rack $m$ which is adapted to slide back and forth in a way beneath the carriage body when acted upon by a pinion N. These ways are formed in blocks M' carried by two vertical posts O, passing through the floor of the box connected at their lower ends by a cross-strap $o$, and at their upper ends by a cross-piece or circular casting $o'$ into which they are screwed. The pinion N is carried by the shaft N' having a suitable bearing in the floor of the box, and in the upper cross-piece or casting $o'$, and has secured to its upper end a horizontal arm P provided at one end with a suitable handle, and preferably having its other end extended beyond the shaft, and adapted to act as a pointer with reference to an indicator or divided circle which may be represented upon the face of the casting $o'$. The arm P is within convenient reach of any one occupying the seat Q. By the interposition of the springs H and K', a yielding connection between the pivoted bracket F' and the rocking bolt K is afforded.

I have not thought it necessary to illustrate any means by which the vehicle may be driven. Of course the power for that purpose may be derived from storage batteries or from a naphtha or gas engine, or other motor carried by the vehicle in many well known ways.

I have shown the invention in the form now best known to me, and embodied in a practical and useful way. It is obvious that the mere details of construction may be modified without departing from the principles of m invention.

I claim as my invention—

1. In a running gear for vehicles, the combination of an axle A, wheel-carrying stud-axles pivoted at the ends thereof, and having rearwardly projecting arms, a bracket pivoted at or about the center of the axle and having rearwardly projecting arms, connecting rods between such arms and the arms projecting from the stud axles, an elliptical spring connected with the bracket, a rocking bolt connected at one end with the upper side of said spring, and having a cross-arm, rearwardly projecting arms connected with the ends of said cross-arm, and provided with racks, a pinion interposed between and operating said racks, and means for operating the pinion located within reach of the occupant of the vehicle, substantially as set forth.

2. In a running gear for vehicles, the combination of the pivoted stud axles, the carrying wheels thereon, the pivoted bracket, the main axle, the cross-piece, a rocking bolt pivoted in the cross-piece, yielding connections between it and the pivoted bracket, a steering device located within reach of the occupant, and operative connections between it and the rocking bolt, substantially as and for the purpose set forth.

3. In a running gear for vehicles, the combination of the pivoted stud axles, the carrying wheels mounted thereon, a pivoted bracket and a connecting rod, connecting the bracket with a projection on each stud axle, two arms for turning the bracket upon its pivot extending rearwardly, and each formed with a rack at the rear end thereof, a pinion located between and gearing with both of said racks, and means for operating the pinion located within reach of the occupant, substantially as set forth.

In testimony whereof I have hereunto subscribed my name.

FREDERICK C. HAAS.

Witnesses:
FRANK S. OBER,
EDWARD C. DAVIDSON.